United States Patent
Chen et al.

(10) Patent No.: US 10,037,230 B2
(45) Date of Patent: Jul. 31, 2018

(54) MANAGING DATA PROCESSING RESOURCES

(71) Applicant: HEWLETT PACKARD ENTERPRISE DEVELOPMENT LP, Houston, TX (US)

(72) Inventors: Yuan Chen, Palo Alto, CA (US); Dejan S. Milojicic, Palo Alto, CA (US); Dazhao Cheng, Concord, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 189 days.

(21) Appl. No.: 15/223,394

(22) Filed: Jul. 29, 2016

(65) Prior Publication Data
US 2018/0032373 A1    Feb. 1, 2018

(51) Int. Cl.
*G06F 9/50* (2006.01)
*G06N 99/00* (2010.01)

(52) U.S. Cl.
CPC ......... *G06F 9/5027* (2013.01); *G06N 99/005* (2013.01)

(58) Field of Classification Search
CPC .................................................. G06F 9/5027
See application file for complete search history.

(56) References Cited

U.S. PATENT DOCUMENTS

| | | | | |
|---|---|---|---|---|
| 9,424,085 B2* | 8/2016 | Noro | ............ | G06F 9/50 |
| 9,465,660 B2* | 10/2016 | Schroth | ................ | G06F 9/5044 |
| 9,921,880 B2* | 3/2018 | Michael | ................ | H04L 67/10 |
| 2010/0058346 A1* | 3/2010 | Narang | ................ | G06F 9/5066 |
| | | | | 718/102 |

* cited by examiner

*Primary Examiner* — Charlie Sun
(74) *Attorney, Agent, or Firm* — Hewlett Packard Enterprise Patent Department

(57) ABSTRACT

Examples relate to managing data processing resources. In one example, a computing device may: determine, for each of a plurality of data processing jobs, that the job is independent or dependent; allocate data processing resources to an independent job processing pool or a dependent job processing pool based on an initial resource share value indicating how resources are to be allocated between job processing pools; determine a first policy for scheduling data to be processed by processing resources allocated to the independent job processing pool; determine a second policy for scheduling data to be processed by processing resources allocated to the dependent job processing pool; determine an initial parallelism value that specifies a number of concurrently processing jobs; and provide a processing device with instructions to process batches of data using the allocation of data processing resources, the first policy, the second policy, and the initial parallelism value.

19 Claims, 4 Drawing Sheets

MANAGING DATA PROCESSING RESOURCES

BACKGROUND

Computing systems are often used to perform resource intensive and complex data processing applications, such as analytics on streaming input data. Many streaming data processing applications involve performing many jobs on a stream of input data. Some of the jobs included in an application rely on the completion of other jobs before they may be performed, leading to challenges in determining how an application with multiple jobs should be processed.

BRIEF DESCRIPTION OF THE DRAWINGS

The following detailed description references the drawings, wherein.

DETAILED DESCRIPTION

Figure 1:
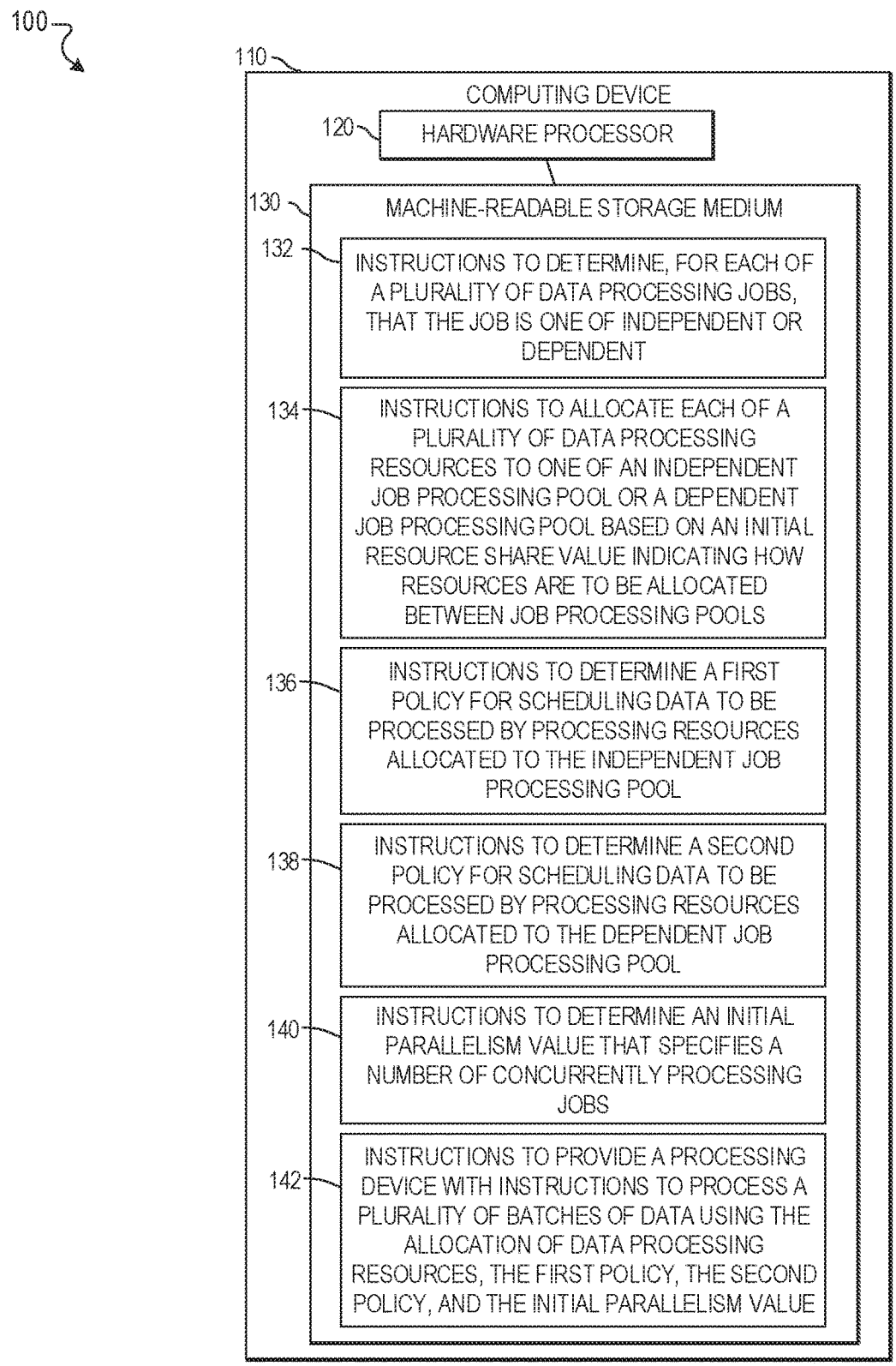
FIG. 1 is a block diagram of an example computing device for managing data processing resources.

Data processing applications may be used to perform a variety of tasks, often involving analytics on streaming data. For example, security event processing applications may be used to detect attacks, e-mail processing applications may be used to filter spam, social media processing applications may be used to analyze user sentiment, and content delivery applications may be used to perform dynamic content delivery. Data processing applications often involve performing multiple jobs, and multiple tasks within those jobs. Many computing resources, e.g., central processing units (CPUs), CPU cores, memory devices, and storage devices, may be used to perform the data processing applications. Using the data dependencies between the jobs for a particular application, a scheduling device may allocate data processing resources to perform the jobs included in a particular application. Jobs may be processed in parallel, and different types of jobs may be scheduled in a different way, e.g., in a manner designed to increase data processing throughput and reduce data latency.

By way of example, a network security system's intrusion detection application may analyze streaming DNS logs to identify potential threats. To process the streaming data in real time, or near-real time, a distributed system of data processing resources may be used to perform a variety of jobs, such as pre-processing the logs, filtering the logs, aggregating logs, matching log addresses with blacklists, and/or behavioral log analysis, to name a few. A scheduling device may identify dependencies between jobs of the application; independent jobs are those that may be performed without needing output of another job, while dependent jobs rely on having output from one or more previous jobs. The dependencies may be identified and/or represented using a directed acyclic graph (DAG), which may be provided by the application or a separate device. In some implementations, job dependencies may be dynamically determined at runtime and updated over time, e.g., after each job finishes execution. In implementations where dependencies are updated over time, jobs may switch from being independent to dependent, or from dependent to independent. For example, a first job that is waiting for output from a second job may be dependent initially, but changed to an independent job after the second job has finished and the output of the second job is ready for the first job.

Using the dependency information, e.g., the DAG, the scheduling device allocates data processing resources into two pools: an independent job pool to be used for processing independent jobs, and a dependent job pool to be used for processing dependent jobs. Resources may be allocated based on a variety of parameters. For example, the proportion of independent and dependent jobs may be used to determine an initial resource allocation, e.g., applications with more independent jobs may have more resources allocated to the independent job pool than the dependent job pool, while applications with more dependent jobs may have more resource allocated to the dependent job pool than the independent job pool. In some implementations, an initial resource share value may be used for an initial resource allocation, and that value may be adjusted over time. Another parameter may be a parallelism value that controls a number of concurrently running jobs, which may again have an initial value that is adjusted over time.

In some implementations, the scheduling device may also assign each job pool a particular scheduling policy for processing data within that job pool. For example, the dependent job pool may be assigned to schedule data processing jobs in a first-in first-out (FIFO) manner while the independent job pool may use a weighted fair sharing method. Other scheduling policies may also be used, and policies may be adjusted over time. In some implementations, a value may be used to determine resource allocation between jobs within a pool, e.g., when using a weighted fair sharing method. For example, when using batch processing—as described in further detail below—batches of data that are older may be weighted more heavily than more recent batches of data, and accordingly have more resources allocated toward their completion. As with other data processing parameters, the resource sharing within a job pool may be adjusted over time, e.g., by prioritizing different jobs and/or prioritizing using different methods.

Mile applications involve the handling of a stream of data, the actual processing may be handled in batches of data. For example, a stream of DNS logs may be batched in one second intervals before being sent for processing in accordance with the intrusion detection application. The batching process may be performed by the scheduling device described above or by a separate device. After performing an initial allocation of resources for processing the DNS logs, a separate processing device may perform the actual data processing and assignment of tasks to individual workers. For example, a processing device may assign individual resources, e.g., computers, CPUs, memory devices, and/or storage devices to perform the various tasks associated with each job included in the application. To perform a particular job on a particular batch of data, for example, the processing device may partition the batch of data and assign partitions to particular resources for executing the tasks of the job in parallel.

In some implementations, performance data may be tracked for the batch jobs that are processed by the application. Performance data may be collected by the processing device or a separate device and may include; for example, latency and throughput values for the application. The scheduling device may use the performance data to adjust various parameters in a manner designed to increase throughput and reduce latency. The adjustments may be made, for example, by re-allocating resources between the independent and dependent job pools, by changing the policies for scheduling batch jobs within the job pools, and/or by changing the parallelism value used by the processing device to determine how many concurrently processing jobs are permissible. A variety of machine learning methods may be used to perform the adjustments to the parameters. For example, the scheduling device may use a reinforcement learning method to tune the parameters over time by comparing the performance of completed batch jobs that use different configurations. Further details regarding the management of data processing resources, e.g., by a scheduling device, are provided in the paragraphs that follow.

Referring now to the drawings, FIG. 1 is a block diagram 100 of an example computing device 110 for managing data processing resources. Computing device 110 may be, for example, a personal computer, a server computer, cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-142, to control processes for managing data processing resources. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-142, for managing data processing resources.

As shown in FIG. 1, the hardware processor 120 executes instructions 132 to determine, for each of a plurality of data processing jobs, that the job is one of independent or dependent. For example, the computing device 110 may receive a DAG associated with a particular computing application, and the DAG may indicate dependencies between the jobs included within a particular application. The DAG may be provided with the application, by a separate device, or generated by the computing device 110, e.g., by analyzing the data input requirements and output of each job.

Applications for which the computing device 110 manages data processing resources may, in some implementations, be designed as streaming data processing applications, e.g., streaming analytics applications. In these situations, computing device 110 may actually facilitate processing a stream of data using batching. For example, the computing device 110 or a separate device may convert a data stream of input, e.g., security event logs, into batches of input. The manner in which streaming data is batched may vary. In applications where throughput and latency is important, smaller batches of data may often be utilized to facilitate increasing throughput while reducing latency, relative to larger batches of data. The actual jobs included in the application remain the same, regardless of whether data is processed in batches or one record at a time.

Using the security event application example, where the application is designed to analyze network DNS logs for potential threats, a DAG associated with the application may define, for each job, whether it is independent or dependent. For example, a pre-processing job that converts the logs into a particular readable format may be one example of an independent job. Another example job, which may be independent or dependent depending on the application, may be a filtering job that filters particular types of logs to reduce the amount of data to be processed by other jobs. An example dependent job may be an aggregation job that takes processed data and aggregates it into more management output. In implementations where dependencies are dynamically adjusted during execution of the application, jobs may be updated after execution, e.g., during batch intervals. In this situation, jobs may change from being independent to dependent, or from being dependent to independent.

The hardware processor 120 executes instructions 134 to allocate each of a plurality of data processing resources to an independent job processing pool or a dependent job processing pool. The allocation is based on an initial resource share value indicating how the resources are to be allocated between job processing pools. In some implementations, this may be initially performed by using initial parameters that may be adjusted over time. For example, an initial value may be a proportion of the independent and dependent jobs, e.g., in the security event application example, the application may include two independent jobs and four dependent jobs, and in this situation one third of the available processing resources may be allocated to the independent job pool while two thirds of the resources may be allocated to the dependent job pool. In situations where jobs are dynamically updated and changed from being independent to dependent or dependent to independent, the resource allocation may be adjusted in response to those adjustments. In addition, and as described in further detail below, other factors, such as application performance, may be used to adjust the allocation of resources between pools over time.

The hardware processor 120 executes instructions 136 to determine a first policy for scheduling data to be processed by processing resources allocated to the independent job processing pool. For example, a FIFO policy that executes batch jobs in the order they are received may be used by default. As another example, a weighted fair sharing policy may be used by default, where the weights determine the order in which independent batch jobs are processed. Other policies may also be used, such as a priority-based scheduling policy that assigns batches of data based on batch intervals, e.g., using a ratio of the number of jobs to be processed from a particular batch interval to the number of jobs to be processed from a later batch interval. As with the resource allocations, the first policy, or aspects of the first policy such as weights and ratios, may be adjusted over time.

The hardware processor 120 executes instructions 138 to determine a second policy for scheduling data to be processed by processing resources allocated to the dependent job processing pool. In some implementations, the second policy is different from the first policy. For example, the second policy may be a first-in first-out policy, e.g., resulting in batches being processed by the data processing resources of the dependent job processing pool in the order in which they are received. As with the first policy, the second policy, or aspects of the second policy, may be adjusted over time.

The hardware processor 120 executes instructions 140 to determine an initial parallelism value that specifies a number of concurrently processing jobs. For example, an initial parallelism value of three would limit the number of concurrently processing jobs to three. The initial parallelism value may be a default value, and as with other parameters controlled by the computing device 120, it may be adjusted over time.

The hardware processor 120 executes instructions 142 to provide a processing device with instructions to process a plurality of batches of data using the allocation of data processing resources, the first policy, the second policy, and the initial parallelism value. In this example implementation, the computing device 110 is not responsible for executing the application, and provides instructions to an execution engine, e.g., operating on a separate computing device. The separate processing device executes the application according to the resource allocations and parameters provided by the computing device 110.

The separate processing device may execute the application using the instructions provided by the hardware processor. Using the security event application example provided above, a separate processing device may assign batch jobs to individual computers in a computing cluster, e.g., a filtering job may be assigned to one group of computers while a behavioral analysis job may be assigned to a second group of computers. The manner in which the processing device schedules batch jobs depends upon the information and instructions provided by the hardware processor regarding the resources allocated to performing independent and dependent jobs, scheduling policies, and parallelism.

In some implementation, the hardware processor 120 may execute instructions to receive application performance data that indicates at least one measure of performance for processing at least one of the batches of data. In this situation, at least some of the data processing resources may be re-allocated based on the application performance data. For example, given a particular latency measurement and/or throughput measurement for a particular batch job that was processed using a particular set of parameters, the hardware processor may re-allocate resources from the independent job pool to the dependent job pool. The receipt of performance data and re-allocation may be iteratively performed over time and/or based on triggering events.

In some implementations, the initial parallelism value may be adjusted based on the performance data. For example, the hardware processor 120 may determine to adjust parallelism from three to four, or from three to two, in a manner designed to increase throughput and reduce latency. Scheduling policies used to schedule jobs, e.g., FIFO and weighted fair scheduling, may also be adjusted over time.

As noted above adjustments to resource allocation, scheduling policies and parallelism, may be adjusted over time, e.g., iteratively and/or based on triggering events. In some implementations, the computing device 110 may use machine learning algorithms to determine a set of parameters designed to maximize throughput and minimize latency for a particular application. For example, a reinforcement learning based algorithm may adaptively tune the parameters over time, identifying configurations that perform well by comparing measured performance data of completed batch jobs in a self-adaptive manner.

Figure 2:
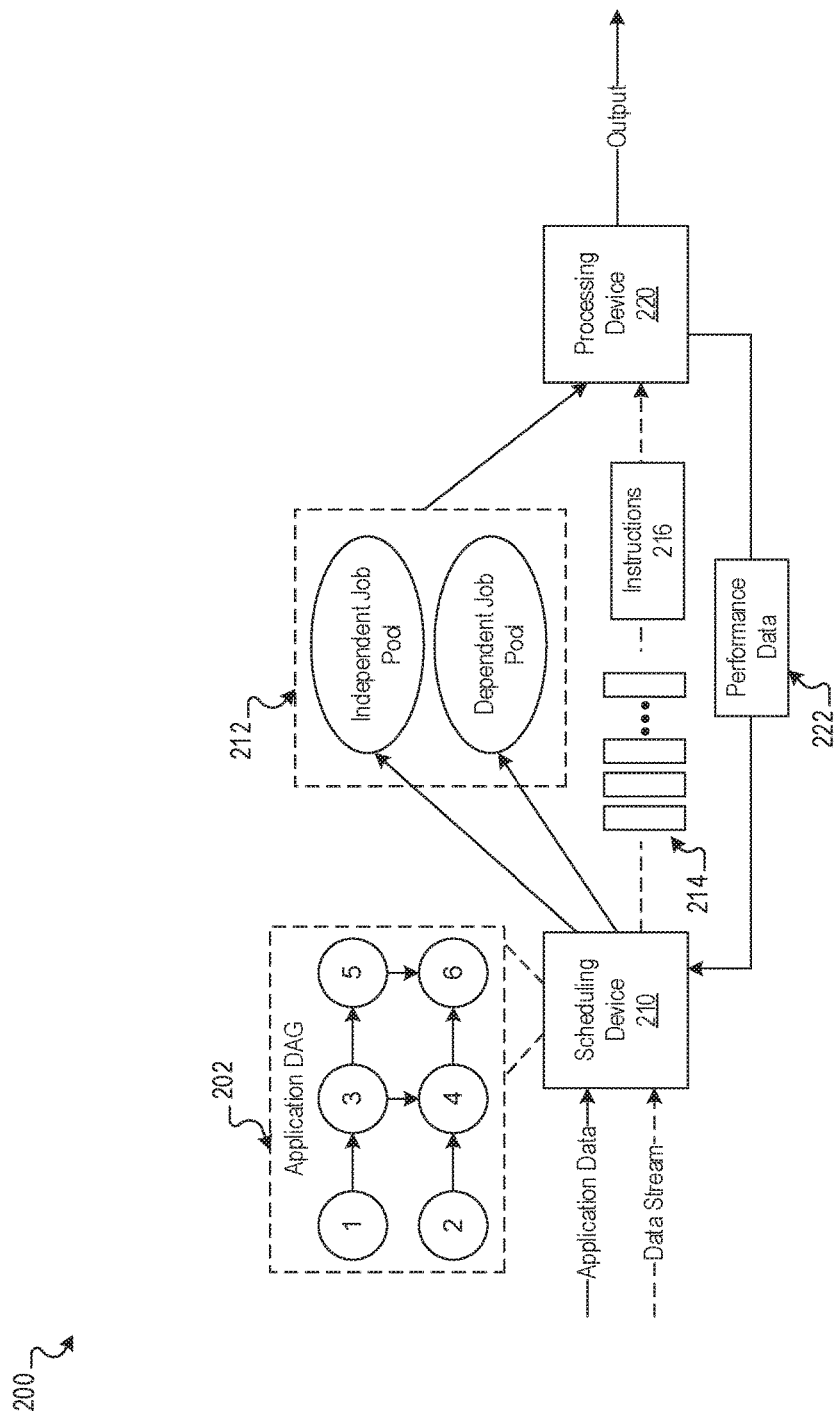
FIG. 2 is a data flow depicting data processing resource management.

FIG. 2 is a data flow 200 depicting data processing resource management. The data flow 200 depicts a scheduling device 210 and a processing device 220 performing a variety of functions. The scheduling device 210 and processing device may be the same as or similar to the computing device 110 of FIG. 1. Other implementations may include additional devices or a single device performing the operations of the scheduling device 210 and/or processing device.

During operation, the scheduling device 210 receives application data that provides information about an application to be processed by the data processing system depicted in the data flow 200. For example, the application data may include a DAG 202 for the application, or include information that enables the scheduling device to create a DAG 202. The example application DAG 202 specifies the dependency relationship between each of six jobs included in the example application. In the example data flow 200, the scheduling device 210 uses the application DAG 202 to determine which jobs are independent, and which are dependent. In some implementations, the scheduling device may determine dependency based on the jobs themselves. For example, jobs that only rely on currently existing data—e.g., that don't rely on output from another job—may be independent, while jobs that require output of another job that has not yet been performed may be identified as dependent jobs. In some implementations, dependencies may exist between batches of data, e.g., a particular job may require the output of multiple batches of data from at least one prior job. In this situation, the job may be dependent due to its reliance on a certain number of batch processing intervals needing to be complete before the job continues performing.

Based at least in part on the dependencies between jobs of the application, the scheduling device allocates resources into one of two job pools: an independent job pool for resources that are to be used to perform independent jobs and a dependent job pool for resources that are to be used to perform dependent jobs. In some implementations, an initial resource share value may be used to allocate the data processing resources into job pools. An example proportional allocation may allocate resources in a manner proportional to the job dependencies, e.g., two of the six jobs (1 and 2) in the DAG 202 are independent while four of the six jobs (3-6) are dependent, which may result in ⅓ of all data processing resources being allocated to the independent job pool and the remaining ⅔ of the data processing resources being allocated to the dependent job pool.

As noted above, the data processing resources may include a variety of actual resources to be allocated, in groups and/or individually. For example, each data processing resource may be a computer, a CPU, a data storage device, a memory device, etc. By way of example, data processing resources may each be a server computer included in a pool of server computers designed for data processing, each computer including its own CPUs, cores, data storage devices, and memory. Allocations of resources in this situation may include allocating individual servers to the different job processing pools. In another example, processing cores included on multiple CPUs and servers may be treated as individual resources; and processing cores may each be allocated to a particular job pool. Other types of computing resources, e.g., virtual machines, ASIC devices, and/or FPGAs, may also be computing resources capable of allocation to one of the job pools.

In the example data flow 200, the scheduling device 210 receives a data stream to be processed by the depicted system. For example, a network security application may provide a stream of network log entries, while a social media sentiment analysis application may provide a stream of user comments or posts. From the stream of data, the scheduling device 210 obtains batches of data 214. Batches may be obtained in a variety of ways, e.g., by breaking streaming data into batches based on number of records, batch size, window of time received, and/or window of time the data was recorded.

The scheduling device 210 also determines an initial parallelism value that specifies a maximum number of concurrently processing jobs. In some implementations this value starts at a default parallelism value which may, for example, be specified by an administrator or based on historical application performance for the same type of application or a similar application.

The scheduling device 210 provides the batches of data 214 to the data processor 220 with instructions 216 that cause the data processor to process the batches 214 in accordance with the initial parallelism value and allocation of data processing resources. The processing device 220 is responsible for the assignment of various tasks to the data processing resources and for initiating execution of the jobs included in the application. However, the processing device 220 uses the instructions and resource allocations provided by the scheduling device 210. For example, the processing device 220 may only use resources in the independent job pool for processing independent jobs, and may only use resources in the dependent job pool for processing dependent jobs. In addition, the processing device 220 may cause jobs to execute in parallel, but no more than the number specified by the initial parallelism value.

In some implementations, the instructions 216 also include scheduling policies for the job pools. For example, each job pool may be associated with a particular scheduling policy, e.g., weighted fair sharing, round robin, and/or FIFO, and the instructions 216 cause the processing device 220 to schedule the batch jobs in accordance with the associated policies.

In the example data flow 200, the processing device 220 provides performance data 222 to the scheduling device 210. The performance data 222 may indicate at least one measure of performance for processing the batches of data 214 in accordance with the instructions 216. The data may include, for example measures of throughput and latency for processing each of the batches. The performance data 222 may be used to adjust various aspects of the data processing system in a manner designed to improve performance. For example, the scheduling device 210 may re-allocate some of the data processing resources between the independent and dependent job pools. The scheduling device 210 may adjust the initial parallelism value and/or adjust the scheduling policies used by the job pools.

The methods used by the scheduling device 210 to adjust various aspects of the data processing system may vary. An administrator may manually adjust parameters based on the performance results, and/or machine learning methods may be used to determine which adjustments are to be made, if any. The performance data 222 may, in some implementations, be provided periodically based on the passage of time or number of batches processed, and/or provided in response to a triggering event, such as user input, a latency threshold being met, and/or a throughput threshold being met. A reinforcement learning based algorithm is one example of a machine learning method which may be used to adaptively tune the parameters that control the processing of data within the depicted system. A reinforcement learning algorithm may, for example, be designed to maximize a reward function that is designed to increase throughput of a reference value, such as a default value, taking into account any penalties associated with violation of any Service Level Agreements (SLAs). Many other methods or combinations of methods may also be used to adjust the parameters used to process the batches of data 214.

While the example data flow 200 depicts two devices—the scheduling device 210 and processing device 220—as performing the management tasks associated with the data processing system, different configurations may also be used. For example, a single computing device may be responsible for the actions described as being performed by both separate devices. One or more additional devices may be used to perform some of the operations described as being performed by the two devices. For example, a separate input processing device may be responsible for converting the data stream into batches and providing the batches to the processing device 220. As another example, a separate feedback device may be used to collect performance data 222 and report the performance data 222 back to the scheduling device 210. Additional configurations may also be used.

Figure 3:
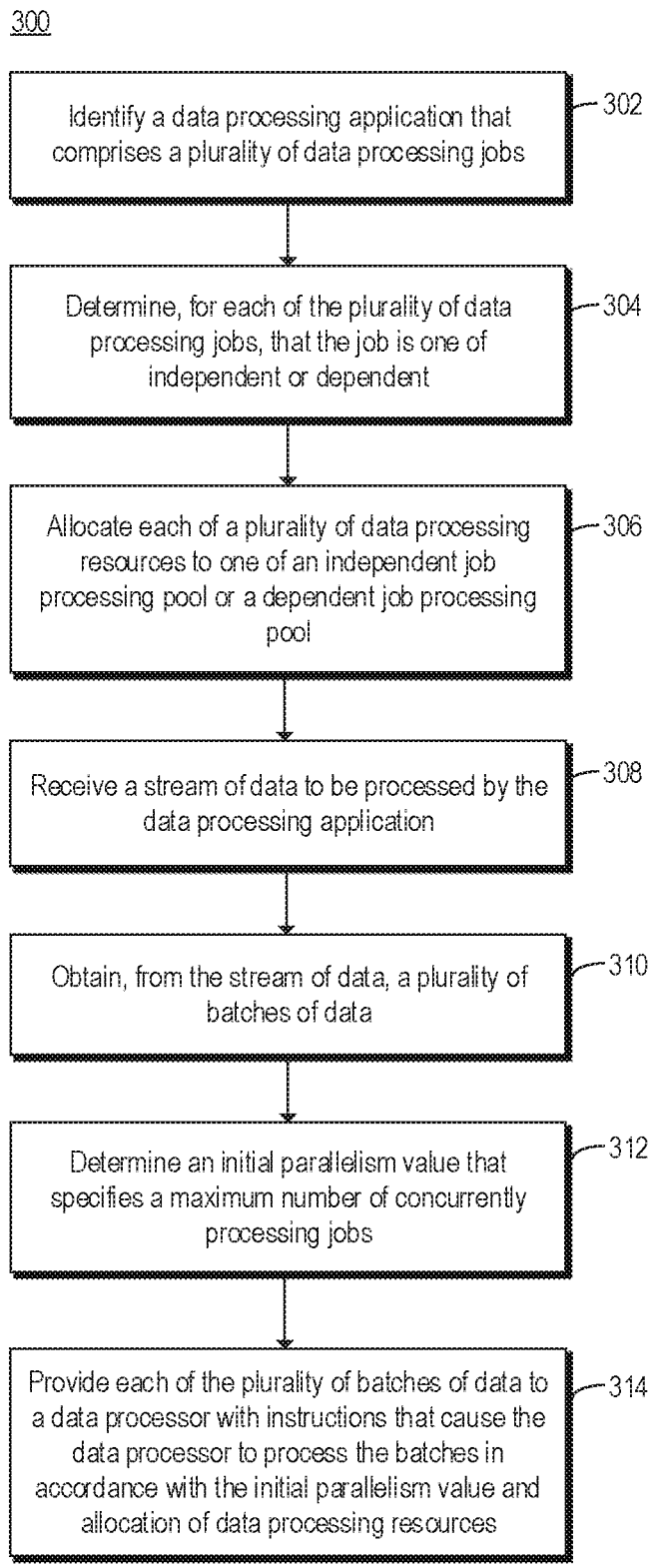
FIG. 3 is a flowchart of an example method for performing data processing resource management.

FIG. 3 is a flowchart of an example method 300 for performing data processing resource management. The method 300 may be performed by a computing device, such as a computing device described in FIG. 1. Other computing devices may also be used to execute method 300. Method 300 may be implemented in the form of executable instructions stored on a machine-readable storage medium, such as the storage medium 130, and/or in the form of electronic circuitry.

A data processing application that comprises a plurality of data processing jobs is identified (302). Data processing applications may include many jobs used to perform the application. One example data processing application may be a MapReduce application for processing a stream of data for a content delivery system.

For each of the plurality of data processing jobs, a determination is made that the job is independent or dependent (304). This determination may be made based on the jobs themselves and the input they require and/or using data provided with the application, such as a DAG that defines job dependencies. A MapReduce application, for example, may include an independent map job that does not require input from another job, and a dependent reduce job that requires the output from the map job as input.

Each of a plurality of data processing resources are allocated to either an independent job processing pool or a dependent job processing pool (306). For example, an initial value or values may be used to allocate jobs to various processing pools. The value may be, for example, a default value or based on historical performance, and it may indicate proportional resources to be allocated for independent and/or independent jobs. For example, an initial allocation value of 1.5 may indicate that independent jobs should be allocated 1.5× the resources of dependent jobs. In the example situation with a single independent and single dependent job, the independent job may initially be allocated with 1.5× the resources of the dependent job.

A stream of data to be processed by the data processing application is received (308). For example, a MapReduce application may provide internet logs for content delivery consumers. This data may be obtained from a client device or devices associated with the application, e.g., the entity for which the application is being performed.

From the stream of data, a plurality of batches of data are obtained (310). As described above, streaming data may be broken into batches in a variety of ways, e.g., based on number of records, batch size, window of time in which data is received, and/or window of time in which data was recorded.

An initial parallelism value is determined that specifies a maximum number of concurrently processing jobs (312). The parallelism value may be determined, for example, using a default value, based on historical parallelism performance for the particular application, or based on parallelism performance of other applications.

Each of the batches of data are provided to a data processor with instructions that cause the data processor to process the batches in accordance with the initial parallelism value and allocation of data processing resources (314). The data processor may be responsible for assigning the actual tasks to individual resources and causing execution of the jobs using the provided instructions.

In some implementations, the instructions may include scheduling policies to be used by the resources included in the data processing pools. For example, a weighted fair sharing scheduling policy may be assigned to the independent job processing pool while a FIFO scheduling policy may be assigned to the dependent job processing pool.

In some implementations, the method 300 may include the receipt of performance data, which may be used to adjust the initial parallelism value, the allocation of resources between job pools, and/or the scheduling policies used for the job pools. Machine learning methods, for example, may be used in a manner designed to achieve certain throughout and/or latency values for batches being processed in accordance with various configurations of the parameters described above.

Figure 4:
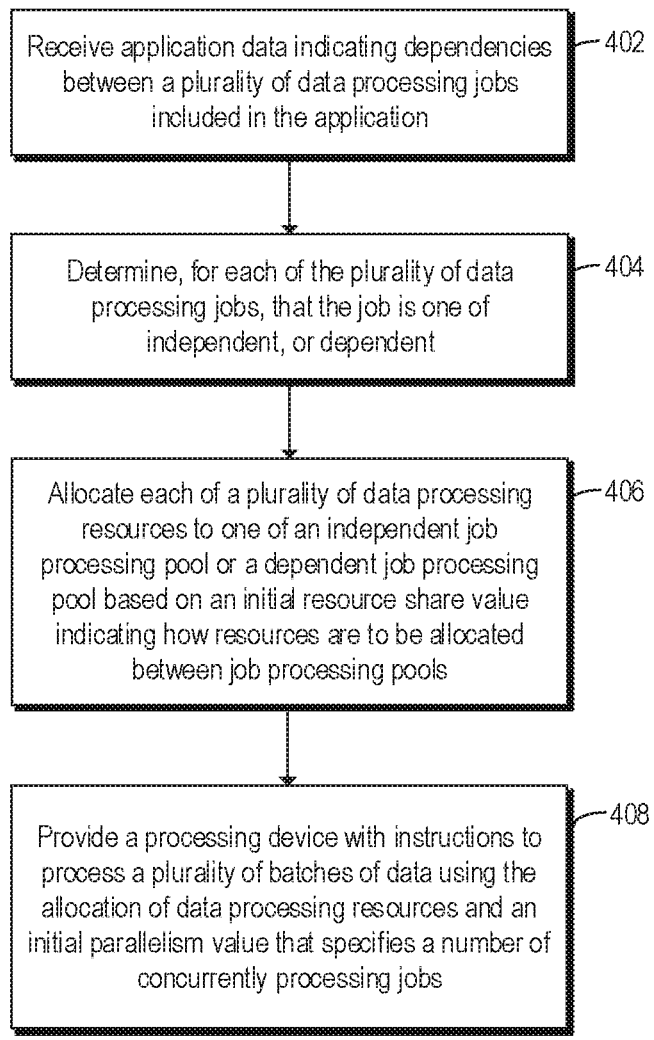
FIG. 4 is a flowchart of an example method for managing data processing resources.

FIG. 4 is a flowchart of an example method for managing data processing resources. The method 400 may be performed by a computing device, such as a computing device described in FIG. 1. Other computing devices may also be used to execute method 400. Method 400 may be implemented in the form of executable instructions stored on a machine-readable storage medium, such as the storage medium 130, and/or in the form of electronic circuitry.

Application data is received that indicates dependencies between a plurality of data processing jobs included in an application (402). For example, a DAG may be provided with a streaming data processing application. The DAG may indicate which jobs are independent and which are dependent.

For each of the data processing jobs, it is determined that the job is either independent or dependent (404). In this example, the dependencies of the jobs is likely to be determined using the DAG; however, other methods for determining dependencies—described above—may also be used.

Each of a plurality of data processing resources are allocated to either an independent job processing pool or a dependent job processing pool. The allocation is based on an initial resource share value that indicates how resources are to be allocated between job processing pools (406). For example, an initial resource share value may provide that independent jobs should get twice the data processing resources of dependent jobs. In this example, given 3 independent jobs, 2 dependent jobs, and 100 server computers as resources, the initial allocation may result in 75 server computers allocated to the independent job pool and 25 server computers allocated to the dependent job pool.

A processing device is provided with instructions to process a plurality of batches of data using the allocation of data processing resources and an initial parallelism value that specifies a number of concurrently processing jobs (408). The initial parallelism value may be predetermined, e.g., based on a default value, historical performance of the particular application, or historical performance of similar applications. The processing device provided with the instructions, in this implementation, is responsible for executing the application using the data processing resources in accordance with the instructions. In some implementations, and as described in further detail above, scheduling policies to be used by the processing device may also be included in the instructions. Performance data may be used to update the parameters included in the instructions over time, e.g., using machine learning methods and/or user feedback.

While the methods 300 and 400 are described with respect to a single computing device, various portions of the methods may be performed by other computing devices. For example, one computing device may be responsible for receiving streaming data and converting it into batches of data while another computing device is responsible for allocating the data processing resources.

The foregoing disclosure describes a number of example implementations for managing data processing resources. As detailed above, examples provide a mechanism for using job dependencies, parallelism parameters, and scheduling policies to manage the manner in which data is processed.

We claim:

1. A non-transitory machine-readable storage medium encoded with instructions executable by a hardware processor of a computing device for managing data processing resources, the machine-readable storage medium comprising instructions to cause the hardware processor to:
    determine, for each of a plurality of data processing jobs, that the job is one of independent or dependent;
    allocate each of a plurality of data processing resources to one of an independent job processing pool or a dependent job processing pool based on an initial resource share value indicating how resources are to be allocated between job processing pools;
    determine a first policy for scheduling data to be processed by processing resources allocated to the independent job processing pool;
    determine a second policy for scheduling data to be processed by processing resources allocated to the dependent job processing pool;
    determine an initial parallelism value that specifies a number of concurrently processing jobs; and
    provide a processing device with instructions to process a plurality of batches of data using the allocation of data processing resources, the first policy, the second policy, and the initial parallelism value.

2. The storage medium of claim 1, wherein the initial resource share value is based on a number of independent jobs and a number dependent jobs.

3. The storage medium of claim 2, wherein the instructions further cause the hardware processor to:
    receive application performance data that indicates at least one measure of performance for processing at least one of the plurality of batches of data; and
    re-allocate at least some of the plurality of data processing resources based on the application performance data.

4. The storage medium of claim 3, wherein the instructions further cause the hardware processor to:
    adjust the initial parallelism value based on the application performance data.

5. The storage medium of claim 1, wherein:
each job determined to be independent is determined to be independent based on the job relying only on currently existing data, and
each job determined to be dependent is determined to be dependent based on the job requiring output of another job that has not yet been performed.

6. The storage medium of claim 1, wherein:
the first policy is a weighted fair scheduling policy; and
the second policy is a first-in first-out policy.

7. A method for managing data processing resources, implemented by a hardware processor, the method comprising:
identifying a data processing application that comprises a plurality of data processing jobs;
determining, for each of the plurality of data processing jobs, that the job is one of independent or dependent;
allocating each of a plurality of data processing resources to one of an independent job processing pool or a dependent job processing pool;
receiving a stream of data to be processed by the data processing application;
obtaining, from the stream of data, a plurality of batches of data;
determining an initial parallelism value that specifies a maximum number of concurrently processing jobs; and
providing each of the plurality of batches of data to a data processor with instructions that cause the data processor to process the batches in accordance with the initial parallelism value and allocation of data processing resources.

8. The method of claim 7, wherein:
each job determined to be independent is determined to be independent based on the job relying only on currently existing data, and
each job determined to be dependent is determined to be dependent based on the job requiring output of another job that has not yet been performed.

9. The method of claim 8, wherein each determination that the job is one of independent or dependent is based on a directed acyclic graph identified for the data processing application.

10. The method of claim 7, wherein:
each of the plurality of data processing resources are allocated based on an initial resource share value indicating how resources are to be allocated between job processing pools, and
the instructions include:
a first policy for scheduling independent jobs to be processed by processing resources allocated to the independent job processing pool; and
a second policy for scheduling dependent jobs to be processed by processing resources allocated to the dependent job processing pool.

11. The method of claim 10, wherein:
the first policy is a weighted fair scheduling policy used to schedule independent jobs based on batch processing intervals; and
the second policy is a first-in first-out scheduling policy.

12. The method of claim 10, further comprising:
receiving application performance data that indicates at least one measure of performance for processing at least one of the plurality of batches of data in accordance with the instructions; and
re-allocating at least some of the plurality of data processing resources based on the application performance data.

13. The method of claim 12, further comprising:
adjusting the initial parallelism value based on the application performance data.

14. A computing device for managing data processing resources, the computing device comprising:
a hardware processor; and
a data storage device storing instructions that, when executed by the hardware processor, cause the hardware processor to:
receive application data indicating dependencies between a plurality of data processing jobs included in an application;
determine, for each of the plurality of data processing jobs, that the job is one of independent, or dependent;
allocate each of a plurality of data processing resources to one of an independent job processing pool or a dependent job processing pool based on an initial resource share value indicating how resources are to be allocated between job processing pools;
provide a processing device with instructions to process a plurality of batches of data using the allocation of data processing resources and an initial parallelism value that specifies a number of concurrently processing jobs.

15. The computing device of claim 14, wherein the initial resource share value is based on a number of independent jobs and a number dependent jobs.

16. The computing device of claim 14, wherein:
each job determined to be independent is determined to be independent based on the job relying only on currently existing data, and
each job determined to be dependent is determined to be dependent based on the job requiring output of another job that has not yet been performed.

17. The computing device of claim 14, wherein the instructions include:
a first policy for scheduling independent jobs to be processed by processing resources allocated to the independent job processing pool; and
a second policy for scheduling dependent jobs to be processed by processing resources allocated to the dependent job processing pool.

18. The computing device of claim 17, wherein:
the first policy is a weighted fair scheduling policy; and
the second policy is a first-in first-out policy.

19. The computing device of claim 14, wherein the instructions further cause the hardware processor to:
receive application performance data that indicates at least one measure of performance for processing at least one of the plurality of batches of data; and
either i) re-allocate at least some of the plurality of data processing resources based on the application performance data, or ii) adjust the initial parallelism value based on the application performance data.

* * * * *